United States Patent [19]

Weidel

[11] Patent Number: 4,592,619

[45] Date of Patent: Jun. 3, 1986

[54] OPTICAL COUPLING DEVICE

[75] Inventor: Edgar Weidel, Senden, Fed. Rep. of Germany

[73] Assignee: Licentia Patent-Verwaltungs GmbH, Fed. Rep. of Germany

[21] Appl. No.: 528,069

[22] Filed: Aug. 31, 1983

[30] Foreign Application Priority Data

Sep. 3, 1982 [DE] Fed. Rep. of Germany ....... 3232793

[51] Int. Cl.[4] ........................... G02B 6/12; G02B 6/26; G02B 6/36; G02B 5/30
[52] U.S. Cl. .............................. 350/96.11; 350/96.15; 350/96.18; 350/388
[58] Field of Search ............... 350/96.11, 96.13, 96.14, 350/96.15, 96.18, 96.19, 388, 392; 455/612, 610

[56] References Cited

U.S. PATENT DOCUMENTS

| | | | |
|---|---|---|---|
| 4,210,803 | 7/1980 | Ih ................................... | 350/96.14 X |
| 4,268,756 | 5/1981 | Grouse et al. ..................... | 250/551 |
| 4,327,963 | 5/1982 | Khoe et al. ....................... | 350/96.18 |
| 4,327,971 | 5/1982 | Kondo et al. ..................... | 350/388 |
| 4,348,074 | 9/1982 | Burns et al. ...................... | 350/96.11 |
| 4,448,524 | 5/1984 | Brus et al. ....................... | 350/96.12 X |

FOREIGN PATENT DOCUMENTS

| | | |
|---|---|---|
| 2933245 | 6/1980 | Fed. Rep. of Germany . |
| 2916234 | 10/1980 | Fed. Rep. of Germany . |
| 5781227 | 10/1980 | Japan ............................... 350/96.18 |
| 0070507 | 6/1981 | Japan ............................... 350/96.18 |
| 0085701 | 7/1981 | Japan ............................... 350/96.18 |

OTHER PUBLICATIONS

"Optical Multiplexer/Demultiplexers Using Thin-Film Optical Filters" by Kiyoshi et al, Fijitsu, Scientific & Technical Journal, vol. 16, No. 4, Dec. 1980 (pp. 17-36).

"Arrays of Electro-Optical Interfaces for Optical Data Links" by Albanese National Electr. Conf., vol. 33 (1979) Oct. 29-31 (pp. 185-187).

"Product Focus," Electronic Engineering, Jan. 1981, vol. 53, No. 647.

*Primary Examiner*—William L. Sikes
*Assistant Examiner*—Akm E. Ullah
*Attorney, Agent, or Firm*—McGlew and Tuttle

[57] ABSTRACT

An optical coupling element is provided between a semiconductor transmitter, a semiconductor receiver and a lightwave guide. The optical coupling is effected through microoptics which are adjustable in a simple way. Such a coupling element is useful particularly as a subscriber's connection in an optical waveguide duplex or multiplex communication system and uses a reflective planar surface with a reflection which is responsive to the wavelength to pass light to the transmitted and reflected light to be received.

18 Claims, 3 Drawing Figures

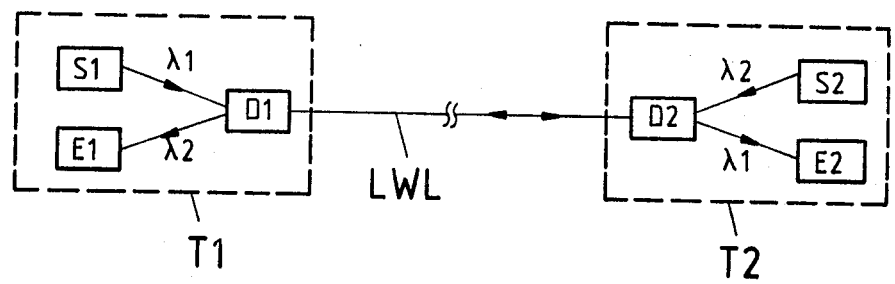
(PRIOR ART) FIG. 1
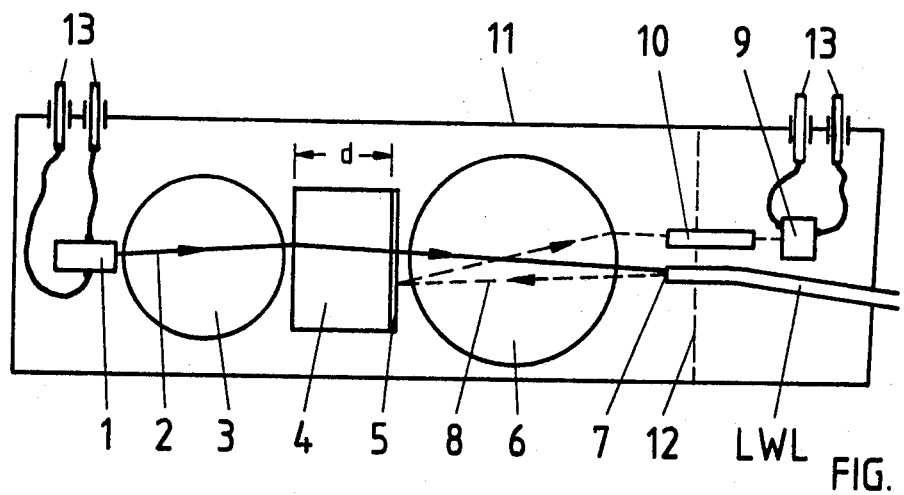
FIG. 2
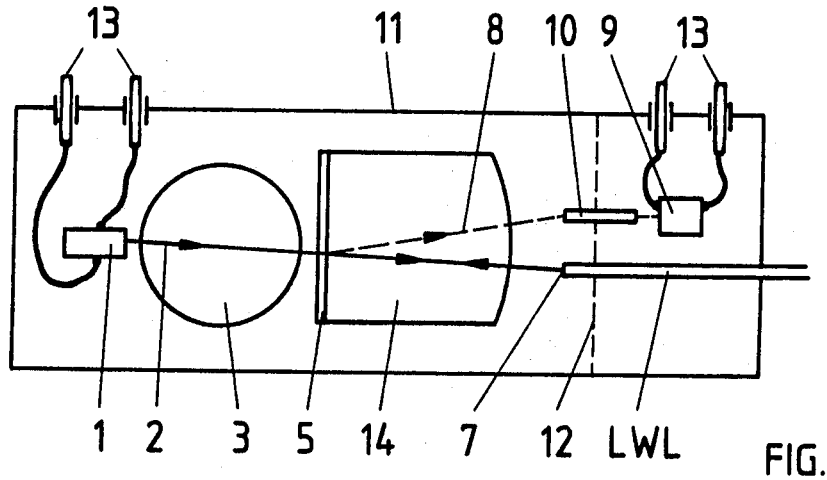
FIG. 3

OPTICAL COUPLING DEVICE

FIELD AND BACKGROUND OF THE INVENTION

The present invention relates in general to optical couplers and in particular to a new and useful optical coupling device which is capable of coupling a light transmitter and light receiver to a single optical waveguide.

Such a coupling element is usable particularly in optical waveguide communication systems with duplex or multiplex operation. Systems of this kind have the advantage that for a simultaneous duplex operation at longer distances, such as of some kilometers, a single light (optical) waveguide is needed.

FIG. 1 shows such a system for two transmitting and/or receiving stations T1 and T2 which are optically coupled to each other by a waveguide LWL. Each transmitting and/or receiving station comprises a transmitter S1, S2, such as a semiconductor laser, with the two transmitters sending out radiations of unequal wavelengths $\lambda_1$, $\lambda_2$, a receiver E1, E2 such as a photodiode, and a wavelength-dependent coupling element, a duplexer D1, D2, by which the transmitter and the receiver of a transmitting and/or receiving station are coupled to the waveguide. Such a coupling element produces the effect that the radiation mixture transmitted in the lightwave guide LWL in opposite directions passes to the desired receiver, and that no undesired radiation passes to the transmitters. For example, the radiation sent out by transmitter S1 and having a wavelength $\lambda_1$ arrives only at receiver E2 (and not at the receiver E1). This path is indicated by arrows.

Such an arrangement is disadvantageous and not economical since the transmitter, receiver, and duplexer in a transmitting and/or receiving station are individual component parts which are coupled to each other by optical means, for example optical waveguides. Such a coupling requires time consuming and expensive adjustment and assemblage. Also, considerable optical losses are to be taken into account since there are many locations of optical coupling, for example splices between the component parts and the optical paths.

SUMMARY OF THE INVENTION

The invention is directed to a coupling element of the above mentioned kind which is expensive in manufacture, of compact structure, and insensitive to disturbances.

Accordingly, an object of the present invention is to provide an optical coupling device which comprises microoptics elements with spherical and plane surfaces for collimating and focusing a beam of electromagnetic radiation, one mirror element having at least reflective planar surface with a reflection characteristic which is responsive and changes according to wavelength of the electromagnetic radiation, a transmitter for generating a first beam of electromagnetic radiation which passes through the microoptic elements along a first beam path, a waveguide for guiding electromagnetic radiation having a front face lying in the first beam path for receiving the focused first beam from the microoptic elements, the waveguide adapted to guide a second beam of electromagnetic radiation along a second path out from the front face thereof and against the reflective planar surface where the second beam is reflected along the second beam path, and a receiver for receiving electromagnetic radiation lying on the second beam path for receiving the second beam which was reflected by the reflective planar surface.

Another object of the invention is to form the transmitter of an electrooptical semiconductor element and utilize spherical or aspherical lenses on the first and second beam paths to transform the first and second beams.

A still further object of the invention is to form the mirror elements as a plane parallel plate having one surface carrying the reflective planar surface, or to form the plate having one planar surface and an opposite curved surface acting as a lens.

Another object of the invention is to provide an optical coupling device which is simple in design, rugged in construction and economical to manufacture, as well as being insensitive to external disturbances including thermal, electrical and electromagnetic disturbances.

One of the advantages of the invention is that the arrangement using the microoptic elements make it possible to optimize the matching of the transmitters and/or receivers to the light wave guide.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic representation of an optical coupling arrangement showing how a transmitter S1 and receiver E1 is coupled via a duplexer D1 over a single optical waveguide via a duplexer D2 to another transmitter D2 and receiver E1;

FIG. 2 is a schematic top plan view of one embodiment of the invention; and

FIG. 3 is view similar to FIG. 2 of another embodiment of the invention.

DESCRIPTION OF THE PREFERRED EMBODIMENTS

By "microoptics", within the context of this specification, an optical arrangement is understood comprising small-size optical component parts, for example, lenses having a diameter of a few millimeters.

FIG. 2 shows a coupling element in which the microoptics comprises spherical lenses. Radiation 2, such as light having a wavelength $\lambda_1$ of about e.g., 830 and sent out by a transmitter, for example a semiconductor laser 1, is transformed by a first spherical lens 3 and a substantially plane-parallel plate 4 into a collimated first radiation beam. This radiation beam penetrates substantially without losses through a reflective planar surface 5, for example a dielectric interference filter or a diffraction grid vapor-deposited on plate 4, whose reflection depends on the wavelength, and is then directed through a second spherical lens 6 to the front face 7 of a wave guide LWL. The filter 5 is selected to be substantially transparent to light of wavelength $\lambda$, but substantially opaque to light of wavelength $\lambda_2$. The radiation 8 issuing from front face 7, for example a beam of light having a wavelength $\lambda_2$ which is different from the wavelength $\lambda_1$, is transformed by second spherical lens 6 into a collimated second radiation beam. This beam is substantially completely reflected by planar surface 5 and passes through second spherical lens 6 to receiver 9, for example a semiconductor photodiode. In the beam path before receiver 9, an optical filter 10 may be provided, for example a waveguide having a length of some millimeters whose front face is coated with a filter layer transmitting only light with the wavelength λ2. With such a filter, the radiation is filtered selectively in space and wavelength, so that disturbances through scattered light such as from transmitter 1, are eliminated. By properly selecting the optically effective parameter, for example the thickness of plate 4 and/or the radii of spherical lenses 3,6, advantageously an optical path can be obtained having minimum optical losses. Unequal apertures of the transmitter, the receiver, and the waveguide may thus be matched to each other, for example.

The described optical arrangement is accommodated in a compact housing insensible to disturbances, for example a copper cube having an edge length of about 10 mm. Such a housing 11 is useful as a heat trap for transmitter 1. Further provided within housing 11 is a screen 12 effecting an electrical and/or electromagnetic separation of transmitter 1 from receiver 9, so that disturbing electrical or electromagneitc cross talk is prevented. Housing 11 thus screens the optical elements in it, electrically and/or electromagnetically. In addition, electrical terminals 13 are provided on housing 11, for example, electrically insulated pins which are connected within the housing to transmitter 1 and receiver 9. Such a coupling element can inexpensively be soldered onto a printed circuit board (not shown). Further provided in housing 11 may be other electrical component parts (not shown) such as a preamplifier for receiver 9. The waveguide LWL shown in FIG. 2 can be extended to almost any length by an optical splice and/or plug connection.

If the radiation 8 issuing from front face 7 is a mixture of wavelengths, the reflecting planar surface 5 may be embodied as a diffraction grid producing a plurality of radiation beams to be directed to a corresponding number of receivers 9. This makes it possible to receive communication information from a plurality of optical channels.

FIG. 3 shows another embodiment wherein the microoptics comprises only two optical component parts, namely a spherical lens 3 and a planoconvex lens 14 having on its planar side the surface 5 whose reflection depends on the wavelength. The other features and reference numerals correspond to the embodiment of FIG. 2.

The invention is not limited to the shown embodiments, other designs may be provided for such microoptics comprising at least one gradient bar lens.

While specific embodiments of the invention have been shown and described in detail to illustrate the application of the principles of the invention, it will be understood that the invention may be embodied otherwise without departing from such principles.

What is claimed is:

1. An optical coupling device comprising:
   microoptic means with spherical and plane surfaces for collimating and focusing a beam of electromagnetic radiation and a mirror element having at least one reflective planar surface with a reflection characteristic which is responsive and changes according to the wavelength of electromagnetic radiation striking said reflective planar surface, said planar surface being substantially transparent to a first beam of light at a first wavelength and being substantially opaque to a second beam of light at a second wavelength for transmitting the first beam of light and for reflecting the second beam of light;
   a transmitter for generating said first beam of electromagnetic radiation which passes through said microoptics means and through said reflective planar surface substantially without loss on a first beam path;
   a waveguide having a front face line on said first beam path for receiving said collimated and focused first beam, said waveguide adapted to guide said second beam of electromagnetic radiation which follows a second beam path out of said front face and against said reflective planar surface where the second beam is reflected substantially without loss along said second beam path;
   a receiver lying on said second beam path for receiving said second beam; and
   an optical filter which is spatially and wavelength dependent on the electromagnetic radiation and responsive to the wavelength of electromagnetic radiation lying on said second beam path between said microoptics means and said receiver.

2. A device according to claim 2, wherein said second spherical lens is positioned to initially receive said second beam from said front face then receive said beam once more after it is reflected from said reflective planar surface so that said second beam path extends through said second spherical lens twice.

3. A device according to claim 1, wherein said reflective planar surface comprises one of a dielectric mirror and a diffraction grid.

4. A device according to claim 1, including a housing for containing said receiver, transmitter and microoptics means which is capable of electromagnetically and electrically screening said transmitter, receiver and microoptics means.

5. A device according to claim 5, wherein at least one of said transmitter and receiver are designed as hybrid semiconductor component parts.

6. A device according to claim 5, including a screen extending across said housing between said transmitter and said receiver for at electrically and electromagnetically separating said transmitter from said receiver.

7. A device according to claim 1, including at least one lens lying on said first beam path.

8. A device according to claim 8, wherein said lens comprises a spherical lens.

9. A device according to claim 8, wherein said lens comprises an aspherical lens.

10. A device according to claim 8, wherein said lens comprises a gradient rod lens.

11. A device according to claim 1, including a housing made of material to form a heat sink for containing said transmitter, receiver and microoptics means.

12. A device according to claim 1, including a housing containing said transmitter, said receiver and said microoptics means, and an electrical connection mechanically connected to said housing and connected to at least one of said transmitter and receiver, said connection adapted to be connected to a printed circuit board.

13. A device according to claim 13, including at least one amplifier connected to one of said receiver and transmitter and positioned in said housing.

14. A device according to claim 13, including an optical splice connected between said waveguide and said housing for connecting said waveguide to said housing.

15. A device according to claim 1, wherein said microoptics means comprises a plate having one surface containing said reflective planar surface and an opposite curved surface, said plate positioned to receive a portion of said first and second beam paths.

16. An optical coupling device comprising:

microoptics means for collimating a beam of light radiation having one reflective plane surface with reflection which is responsive to the wavelength of light radiation striking said reflective planar surface, said reflective plane surface being substantially transparent to light radiation of a first wave length for transmitting light radiation of said first wavelength substantially without loss, and being substantially opaque to light radiation of a second wavelength for reflecting light radiation of said second wavelength substantially without loss, an electrooptical semiconductor light transmitter for generating a first beam of light radiation at said first wavelength and directing said first beam through said microoptics means to collimate said first beam and through said reflective planar surface substantially without loss on a first beam path;

relatively long waveguide having a front face lying on said first beam path for receiving said collimated first beam, said long waveguide adapted to guide a second beam of light radiation at said second wavelength which follows a second path out of said front face and against said reflective planar surface where the second beam is reflected substantially without loss along said second beam path;

a receiver lying on said second beam for receiving the second beam; and a relatively short wave guide lying on said second beam path between said reflective planar surface and said receiver, said short wave guide having the characteristics of an optical filter which is responsive to light radiation of said second wave length for only transmitting light radiation of said second wave length.

17. A device according to claim 1, including a first spherical lens lying on said first beam path between said transmitter and said microoptics means for refracting said first beam, said microoptics means comprising a plane parallel plate having said reflective planar surface and a second spherical lens lying on said first and second beam paths between said microoptics means and said front face of said waveguide for refracting said first and second beams.

18. An optical coupling device comprising:

a housing having an interior and made of material to shield said interior from at least one of electrical and electromagnetic energy;

a transmitter connected in said housing interior for generating a first beam of light at a first wavelength on a first beam path in said interior;

an optically active plate for collimating said first beam of light on said first beam path and having at least one reflective planar surface which has a reflection characteristic depending on the wavelength of light reflected from said planar surface, said optically active plate being substantially transparent to light of said first wavelength for transmitting said first light beam substantially without loss, and being substantially opaque to light of a second wavelength for reflecting light of said second wavelength substantially without loss;

a waveguide for guiding a second beam of light of said second wavelength and having an end face for decoupling said second beam of light along a second beam path toward said reflective planar surface, said second beam being reflected from said planar surface and a portion of said second beam path extending from said planar surface;

at least one lens lying on said first beam path between said transmitter and said plate for refracting said first beam;

a filter positioned on said second beam path for receiving said second beam from said reflective planar surface and for transmitting only light of said second wavelength; and a receiver lying on said second beam path and on a side of said filter opposite from said planar surface for receiving said second light beam from said filter.

* * * * *